United States Patent
Sundaram et al.

(10) Patent No.: US 9,856,414 B2
(45) Date of Patent: Jan. 2, 2018

(54) COMPOSITIONS, SYSTEMS AND METHODS OF MAKING COATED ADDITIVE COMPONENTS

(71) Applicant: Dober Chemical Corp., Woodridge, IL (US)

(72) Inventors: Magesh Sundaram, Chicago, IL (US); Stephen Mosher, Chandler, AZ (US); Joseph Yaritz, Elkton, MD (US)

(73) Assignee: DOBER CHEMICAL CORP., Woodridge, IL (US)

( * ) Notice: Subject to any disclaimer, the term of this patent is extended or adjusted under 35 U.S.C. 154(b) by 0 days.

(21) Appl. No.: 14/271,012

(22) Filed: May 6, 2014

(65) Prior Publication Data

US 2014/0364345 A1 Dec. 11, 2014

Related U.S. Application Data

(60) Provisional application No. 61/833,286, filed on Jun. 10, 2013.

(51) Int. Cl.
| | |
|---|---|
| *C09K 8/528* | (2006.01) |
| *C09K 8/74* | (2006.01) |
| *C09K 8/80* | (2006.01) |
| *C09K 8/536* | (2006.01) |
| *C09K 8/70* | (2006.01) |
| *C09K 8/92* | (2006.01) |

(52) U.S. Cl.
CPC .............. *C09K 8/805* (2013.01); *C09K 8/528* (2013.01); *C09K 8/536* (2013.01); *C09K 8/706* (2013.01); *C09K 8/92* (2013.01); *C09K 2208/22* (2013.01); *C09K 2208/26* (2013.01); *C09K 2208/28* (2013.01); *C09K 2208/32* (2013.01); *C09K 2208/34* (2013.01)

(58) Field of Classification Search
CPC .......... C09K 8/536; C09K 8/706; C09K 8/92; Y10S 507/902
USPC ....................................................... 507/902
See application file for complete search history.

(56) References Cited

U.S. PATENT DOCUMENTS

| | | |
|---|---|---|
| 5,066,698 A | 11/1991 | Hazan et al. |
| 5,373,901 A | 12/1994 | Norman et al. |
| 6,010,639 A | 1/2000 | Mitchell et al. |
| 6,444,316 B1 | 9/2002 | Reddy et al. |
| 6,527,051 B1 | 3/2003 | Reddy et al. |
| 6,554,071 B1 | 4/2003 | Reddy et al. |
| 6,642,185 B2 | 11/2003 | Crews |
| 6,767,868 B2 | 7/2004 | Dawson et al. |
| 6,878,309 B2 | 4/2005 | Blakemore et al. |
| 6,923,264 B2 | 8/2005 | Slabaugh et al. |
| 7,000,701 B2 | 2/2006 | Todd et al. |
| 7,090,015 B2 | 8/2006 | Todd |
| 7,287,590 B1 | 10/2007 | Sullivan et al. |
| 7,857,051 B2 | 12/2010 | Abad et al. |
| 8,012,914 B2 | 9/2011 | Welton |
| 8,058,212 B2 | 11/2011 | Armstrong |
| 2006/0063693 A1* | 3/2006 | Jakob .................... C01B 15/106 510/445 |
| 2009/0301968 A1 | 12/2009 | Little et al. |
| 2010/0159009 A1 | 6/2010 | Yu et al. |
| 2011/0278008 A1 | 11/2011 | Andersson et al. |
| 2013/0255951 A1* | 10/2013 | Little .................... C09K 8/706 166/305.1 |

OTHER PUBLICATIONS

Shah, Archana, "Eco-friendly Crosslinking Agent for Acid Functional Acrylic Resin" www.e-journals.net.

* cited by examiner

*Primary Examiner* — Aiqun Li

(57) ABSTRACT

Compositions, systems and methods for the prevention or reduction of clumping or sticking of particulate hydraulic fracturing chemical additives. In preferred examples the particulate hydraulic fracturing chemical additives may be coated with, for example, a coating comprising a polymeric component and with or without silica. Inorganic flow agents (IFA) may be applied to the exterior surface of the particulate hydraulic fracturing chemical additives to prevent hardening or clumping of the additives upon storage. Preferably the coating is permeable, but insoluble in an aqueous medium, whereupon the additive components are released into the medium.

13 Claims, No Drawings

COMPOSITIONS, SYSTEMS AND METHODS OF MAKING COATED ADDITIVE COMPONENTS

REFERENCE TO PREVIOUSLY FILED APPLICATIONS

This application claims priority to provisional patent application Ser. No. 61/833,286, filed Jun. 10, 2013, which is specifically incorporated by reference herein in its entirety.

INVENTION AND BACKGROUND

The present invention relates to systems, compositions, and methods involved in the extraction of petroleum, natural gas, coal seam gas, and other substances from wells. In particular, the invention relates to additives used in hydraulic fracturing for the extraction of substances, primarily hydrocarbons, from an underground rock layer. In a particularly preferred embodiment, the invention relates to additive compositions at least partially coated with a water impervious coating, such as a polymer, and agents useful for preventing or reducing clumping of additive particles coated with such polymers.

Hydraulic fracturing, or "fracking" refers to the induction of fractures in underground rock layers by pumping a pressurized fluid within the well in order to cause fracturing of the rock layer in which the substances to be extracted are located. Although also useful for the extraction of other substances, hydraulic fracturing is of particular importance in the extraction of petroleum and natural gas for energy uses. This technology permits the extraction of substantial amounts of hydrocarbons from previously exploited oil and gas wells, thereby enhancing the yield of hydrocarbons from such wells, many of which were formerly considered to have been exhausted.

The vast natural gas reservoirs worldwide, particularly in North America, combined with the efficiency of hydraulic fracturing techniques, has led many experts to consider that natural gas will account for over 25% of world energy demand by 2035. Fracking techniques permit the extraction of large amounts of formerly inaccessible hydrocarbons. The United States, which has a technological and legal advantage over much of the world, is predicted to become the world's largest oil producer within the next 15 to 20 years due to large-scale use of hydraulic fracturing techniques.

Hydraulic fracturing comprises pumping large volumes of water, slurried with sand and/or another rigid agent or "proppant", into a wellbore under high pressure. The water and proppant are combined in a "hydraulic fracturing fluid" or "fracking fluid" which may contain one or more additional chemical additive; such additive(s) may be chosen from a list of specific agent or classes of agents having various purposes, dependent on the petroleum formation into which they are introduced. The subterranean formations in which the hydraulic fracturing fluid is pumped our natural reservoirs typically porous sandstones, limestones, dolomite rocks or shale rock or coal beds. Hydraulic fracturing permits gas and oil to be extracted from rock formations existing at depths from, for example, about 5000 to about 20,000 feet or more. At these depths the porosity of the rock or pressure under which the reservoir is subjected may not be great enough to permit a natural flow of gas and oil from the rock at rates high enough to make its extraction economical. The introduction of fractures in the rock can increase the flow of oil and gas and the overall production of oil and gas from the reservoir rock.

Fractures are created by pumping the fracturing fluid into the well bore at a rate sufficient to increase the pressure within the well to exceed that of the fracture gradient of the rock. When the rock cracks, the proppant within the fracturing fluid keeps the crack open, and extends the crack still farther. The chemical additives are generally chosen for each well and geological formation to optimize the extraction of the gas or oil. For example, acid can be added to scour the perforations made in the rock; a gelling agent such as guar gum helps keep the sand or other granular agent (called a "proppant") in suspension. Later in the process, viscosity reducing agents such as oxidizers and/or enzyme breakers are sometimes added to encourage the flow of hydrocarbons from the fracture site, or to break up the gelling agents and permit the induction of flow.

A typical aqueous hydraulic fracturing fluid comprises about 99.5% to about 90% (by weight) water and proppant, with the remainder of the mass (from about 10% to about 0.5% by weight) being chemicals. Various additives may be in liquid or solid form; additionally, the chemicals and additives disclosed below are examples of chemical agents that may perform the indicated function, and are not intended as an exhaustive list. Those of ordinary skill in the art are well aware of additional or alternative agents to those listed to serve these functions. Moreover, each and every of the indicated functions below may not be required to be used in each, or even any, specific instance.

Proppant:

Used to assist in causing and extending fractures, and maintaining fractures open once formed. Examples of proppants include, but are not limited to, nut shells, plastic beads, glass beads, sand, sintered alumina, urea prills and aluminum spacers.

Acid:

An acid helps dissolve minerals and initiate the fissure in the rock; such acids may comprise, for example, HCl at a concentration of about 0.12% by weight.

Biocide:

A biocide is often added to prevent the growth of bacteria in the water, and thus fouling in the pipe. Various biocides may be used, and their concentration depends upon the specific biocide used; for example, glutaraldehyde may be used as a biocide at a concentration of about 0.001% by weight.

Sodium Chloride:

Sodium chloride permits a delayed breakdown of gel polymer chains, and may be included at a concentration of about 0.1% by weight.

Corrosion Inhibitor:

A corrosion inhibitor may be used to prevent corrosion of the pipe; the coated APS particles of the present invention may provide corrosion inhibiting activity; additional corrosion inhibitors may also be provided, such as N,N-dimethyl formamide at a concentration of about 0.002% by weight.

"Breaker" Chemicals:

"Breakers" are oxidizing agents, enzymes, and/or other chemical agents that facilitate the process of degrading the viscosity enhancing agents of the fracking fluid and thereby decrease the fluid's viscosity when flowback of the gas or oil from fractured rock is desired. Breaker chemicals may include, for example, ammonium persulfate, sodium persulfate, potassium persulfate, sodium chlorite, ammonium bifluoride, ammonium fluoride, sodium fluoride, potassium fluoride, sulfamic acid, citric acid, oxalic acid, ammonium sulfate, sodium acetate and enzymes and mixtures of any two or more of these.

Borate:

Borate salts, which may be used at a concentration of about 0.007% by weight, maintains fluid viscosity as the temperature of the aqueous hydraulic fluid increases partially by promoting the formation of crosslinking between the chains or fibers of gelling agents. This is desirable in order to maintain the solid components of the hydraulic fluid in suspension as the fluid flows into the rock formation.

Lubricants:

Lubricants such as polyacrylamide and petroleum distillates may prevent or minimize friction between fluid and pipe; either or both of these agents may be present at, for example, a combined concentration of about 0.09% by weight.

Gelling Agents:

Gelling agents also help maintain the sand and chemical particles of the present invention in suspension within the fracking fluid. Such agents may include, without limitation, guar gum, hydroxypropyl guar (HPG), carboxymethyl, hydroxypropyl guar (CMHPG), and/or xanthan, and/or hydroxyethyl cellulose, which increase the viscosity of the water phase to help suspend the sand and particles.

Citric Acid:

Citric acid may be present, for example at a concentration of about 0.004% by weight, are to help prevent precipitation of metal oxides from solution.

Potassium Chloride:

Potassium chloride may be present at a concentration of about 0.6% by weight creates a brine carrier fluid.

Carbonates:

Sodium and/or potassium carbonate, which also may be present, maintain the effectiveness of cross linkers.

Alkyl Glycols:

Ethylene glycol and/or polyethylene glycols may also be added to prevent the deposition or formation of scale in the pipe. Solid scale inhibitor forms may alternatively or additionally be present.

Viscosity Enhancing Agent:

Isopropyl, for example, at a concentration of about 0.085% by weight may be added as a thickening agent.

As mentioned above, those of skill in the art are aware that this is a single example of one "typical" hydraulic fracturing fluid, and many variations, additions, and omissions can and should be made to such hydraulic fluids while maintaining the same essential properties to tailor the fluid to the particular oil or gas well conditions to be encountered.

Fracking operations may employ as much as 1,000,000 to 3,000,000 gallons of water or more. The water is generally transported to the site of operations in water trucks. A high-pressure pump, such as a pumper truck, injects the slurry of proppant, chemicals (which may include chemicals in particulate form) and water into the well, as far as 20,000 feet below the surface. The pressurized fluid mixture causes the rock layer to crack. The fissures are maintained open by the sand and/or other proppant so that oil and/or natural gas can flow out of the fissures through the well casing, and be collected from the top of the well.

Depending upon the requirements of the specific fracking operation, and the purpose(s) and class of chemical used, it may be desirable or useful for the chemical to be provided in a delayed or controlled release particle. For example, if the chemical is particularly active, it may exert its activity with greater potency than is required or needed at the well site. For example, the viscosity of the hydraulic fracturing fluid may be very quickly reduced, thereby failing to properly maintain the proppant in suspension. Furthermore, if the chemical agent is a reagent (rather than a catalyst) then the bulk of the chemical may be reacted early in the hydraulic fracturing process, and may not fully penetrate within the well fractures, particularly at depths where the chemicals activity may be particularly desired or required.

To overcome this problem various means can be used to deliver the active chemical to a depth, or proximal to a specific geological structure as desired. For example, a chemical having a particular activity may be substituted with another chemical having similar activity, but with a reduced reactivity or rate of reaction as compared to the first chemical. Additionally, or alternatively, the chemical may be formulated to be comprised in a particle or pellet that is suspended in the fracking fluid. The particulate nature of the fracking additive means that there will be a reduced amount of affidavit in contact with the fracking fluid directly as compared to, for example, a powdered or liquid additive. If the additive is slowly soluble in water, the inside of the particle will become exposed to the fracturing fluid when the outside of the particle has dissolved. This means that the particle will have traveled farther within the wellbore or fracture when it is solubilised or dispersed and the chemical will thus maintain its activity further within the well.

In other embodiments, the additive may be either largely soluble, or soluble in aggregates which disperse from the particle quickly and immediately exert their activity. For example, breaker additives start to degrade the viscosity enhancer in the fracturing fluid upon contact thereby lowering the efficiency of the fracturing process. In such cases, additional time and labor are needed to effect the reduction of the viscosity of fracturing fluids introduced into the subterranean formation. The use of organic breakers such as alkyl formate may alleviate this problem, since they can be applied along with the fracturing fluid. But these types of breakers rely on certain subterranean conditions, such as elevated temperature and time, to effect a viscosity reduction of the fracturing fluid. Since these organic breaker chemicals work on chemical change, such as hydrolysis, they are slow in effecting viscosity reduction. Furthermore, their performance can be unpredictable.

Water-soluble particulate solid chemicals at least partially encapsulated with coatings of water impermeable polymers and the like have been utilized heretofore. The encapsulating coatings on the water-soluble chemicals have been utilized to control the times when the chemicals are released in aqueous fluids. For example, encapsulated particulate solid chemicals have been used in oil and gas well treating fluids such as hydraulic cement slurries, formation fracturing fluids, formation acidizing fluids and the like.

Thus, coated particles have been proposed or used to delay or control the rate of release of fracking fluid additives, including breakers. For example, U.S. Pat. No. 5,102,558 to McDougall et al. discusses coating breaker chemicals (themselves coated onto a seed "substrate" such as urea) with a neutralized sulfonated elastomeric polymer. These polymers seal the water soluble breaker from the fracking fluid; the coating is slowly permeable to water and essentially impermeable to the breaker chemicals under well-bore conditions. Upon introduction into aqueous fracturing fluids or other aqueous wellbore fluids, the encapsulated particle slowly absorbs water by diffusion through the polymeric coating. This water dissolves the breaker substrate and sets up an osmotic gradient that in turn draws in more water. Pressure builds up inside the particle, and it expands until resealable micropores form in its walls. Concentrated substrate solution is then ejected through the micropores into the surrounding medium. This relives the pressure inside the capsule that then shrinks. The micropores reseal, and the process repeats itself until insufficient substrate remains for sufficient osmotic pressure to cause the particles to swell and micropores to form.

Norman et al., U.S. Pat. No. 5,373,901 disclose methods of making encapsulated chemicals for use in controlled time-release applications in hydraulic fracturing operations. In these methods, a coating comprising a partially hydrolyzed acrylic crosslinked to an aziridine or carbodiimide plus particulate silica, is applied to the particulate solid chemical. The hydrophobic acrylic co-polymer is present in this coating in an amount such that it provides a water-impervious dry shield on the encapsulated chemical; the silica particles introduce imperfections in the coating that permit a slowed leeching of the additive in water; preferably the coating provides a short delay in the release of the encapsulated chemical in the presence of water.

Reddy et al., U.S. Pat. No. 6,444,316 disclose methods of making encapsulated chemicals for use in controlled time-release applications. In these methods, a first coating is substantially similar to the coating of the '901 patent. A second, outer coating comprising a porous cross-linked hydrophilic polymer is next formed on the first coating. The porous hydrophilic polymer is present in the second coating in an amount such that when contacted with water it prevents the substantial dissolution of the encapsulated chemical for a selected time period.

Particles such as those disclosed in the '901 and '316 patents above depend upon "the presence of silica in the [outer] coating composition [which aids] . . . in introducing imperfections in the dry coating to facilitate the controlled release of the encapsulated chemical." See e.g., '316 patent. In this system the size of the holes or imperfections created by the silica in the dry layer may be highly variable, and thus the controlled release itself of chemicals from the particle may be variable and depend not only on chemical factors, but on the presence, absence, or amount of mechanical shear forces on the particles due to collapse or closure of fractured rock formations.

International patent application Ser. No. 13/770,531, Little and Sundaram discloses particulate coated additive compositions for use in hydraulic fracturing operations, comprising a coating comprising a polymer and a wax component, wherein the coating may be formulated to be substantially water-impervious at low temperatures, and to release the additive when the formation temperature is above a given temperature or temperature range.

In the case of polymer-coated additive particles, the coating is usually applied in a fluidized bed or other similar spraying apparatus designed to evenly apply the coating while keeping the particles separate. However, while the coated particles are heat- and air-dried, they still tend to clump when they are placed onto packaging or containers. In extreme examples, the particles can form a hard "block" of aggregated particles that cannot be poured or otherwise easily handled for use.

Commercially available anti-adherent agents are used in the drug and food industries, for example, in the manufacture of medical capsules, tablets, and powders to prevent sticking. For example, magnesium stearate, is one of the most commonly used and generally effective such agents. It is used in myriad ways to prevent sticking; for example, magnesium stearate is used as a lubricating agent to prevent ingredients from sticking to manufacturing equipment during the compression of medical powders into tablets.

Other excipients used in the drug and food industries include vegetable and mineral oils, polyethylene glycol, sodium docecyl sulphate, glycerol palmitostearate, sodium stearyl fumarate, talc, and fumed silicone dioxide, and some of these are used as flow agents for foods such as sugar, salt and the like.

Each and every patent, patent publication, and other publication cited in this patent application is hereby expressly and individually incorporated by reference as part of this specification herein in its entirety.

SUMMARY OF THE INVENTION

The methods and compositions involving encapsulating chemicals, such as viscosity reducing chemicals, to slow their release in hydraulic fracturing operations. In certain preferred examples, the invention involves treatment of the exterior of the encapsulated chemicals to prevent sticking or clumping of particles of such encapsulated chemicals.

Clumping and sticking of encapsulated particles of chemical additives for hydraulic fracturing can be a problem. Many such agents have polymeric coatings which can absorb water, or upon which water may be condensed or otherwise deposited, for example, upon storage or transport, particularly in heat or humidity. These coatings can tend to cause the coated additive in particulate form (herein referred to as "APF") particles to aggregate or clump. Upon prolonged storage, or in humid conditions, the clumps can harden with time and make the coated APF difficult or impossible to use.

This tendency to aggregate also causes increases in APF production time, since the coated APF particles must be dried as completely as possible to attempt to reduce the amount of clumping. However, the increased time required to ensure complete drying may slow production, and add expense to the manufacturing process.

Applicants have found that many organic "anti-caking" agents, such as magnesium stearate, will not work to effectively reduce or prevent such sticking or clumping. Other organic agents only provide some reduction of sticking or clumping at a relatively high weight percentage. However, Applicants have surprisingly discovered that inorganic flow agents are extremely effective to reduce the sticking and clumping, and improve the free-flowing character of the coated APF particles at considerably lower weight percentages, thus reducing manufacturing expenses.

Briefly, the encapsulated chemicals may be enclosed within a slowly soluble shell. Alternatively, the chemicals may be encapsulated within a substantially water insoluble shell, coating, or membrane that becomes permeable to at least one component of a hydraulic fracturing fluid during use in hydraulic fracturing operations. The permeability of the coating of the particle is chosen, designed, or otherwise made to slow the diffusion of the fluid component into the coated particle, and/or to slow the diffusion of the dissolved or dispersed chemical from the coated particle into the surrounding fluid so as to prevent the chemical additive from exerting its activity immediately upon its addition to the hydraulic fracturing fluid.

Thus, examples of the present invention involve compositions comprising an encapsulated chemical additive for use with hydraulic fracturing fluids. The coating or membrane which surrounds the encapsulated chemical additive (hereinafter sometimes referred to as "additives in particulate form, or "APF particles") may comprise one or more delayed-release component. Such delayed-release coatings may simply be porous, thereby delaying the dissolution or dispersement of the APF into the fracturing fluid as a function of the size of the pores.

In other examples, the coating may initially be substantially impervious to the fluid (thereby initially keeping the APF undissolved) but later partially or wholly dissociate in response to factors including: time in the presence of a solvent (such as water), heat, pressure, shear forces, and/or other exterior phenomena. In this manner the coating permits the coating to remain substantially intact in an aqueous-based fluid for a period of time without immediately releasing the additive into the fluid.

The present invention includes compositions, methods of making, and methods of using APF particles in hydraulic fracturing applications. In particular examples, the invention is drawn to a coated APF particle comprising a water-dispersible or water-soluble chemical additive partially or wholly encapsulated by a substantially water-insoluble coating comprising a polymer component. Following application of the coating and drying of the coating, an inorganic flow agent ("IFA") is applied to the surface of the coated APF. While in preferred examples the surface of the coated APF is substantially dry, in other embodiments the surfaced of the coated APF may not be substantially dry. When the surface of the APF is not substantially dry, the ability to prevent aggregation of the coated APF particles of wet or damp coated APF may increase production time, and thus lower manufacturing expenses while increasing throughput. Applicants have surprisingly discovered that inorganic flows agents prevent aggregation of coated APFs during storage and transport to a significantly greater degree than do organic-based flow agents such as stearates.

In particular but non-limiting examples, the uncoated APF particles are preferably between about 4 and about 100 mesh, more preferably between about 4 and about 50 mesh, more preferably between about 10 and about 50 mesh, even more preferably between about 20 and about 40 mesh in size. The coating may be applied to any desired thickness or weight percentage; in preferred embodiments the coating is applied at a weight percentage of from about 5%, or about 10% or about 15% or about 20% or about 25% to about 40% or about 50% or about 60% or about 70% 80%, of the total. In one example, the weight percentage is about 30% of the total. It will be understood by one of ordinary skill in the art that any range of values provided in this specification includes a specific disclosure of each and every sub range, as expressed in natural numbers or decimal fractions thereof to two significant figures, contained between the high and low values of the broadest range.

In certain examples, the coated APF may comprise a solid coating that dissolves at temperatures above a pre-selected temperature, such as (without limitation) above 100° F. to about 300° F. The coating may comprise at least one water soluble surfactant component selected from the group consisting of carboxylates, polyalkoxycarboxylates, alkylbenzenesulfonates, alkylarylsulfonates, lignosulfonates, naphthalenesulfonates, petroleum sulfonates, ethoxylated and sulfated alcohols, ethoxylated and sulfated alkylphenols, sulfated acids, amides and esters, sulfated natural oils and fats, phosphate esters, polyoxyethylene ethoxylates, alkylphenol ethoxylates, carboxylic acid esters, glycero esters, polyoxyethylene esters, ethoxylated natural fats, oils and waxes, glycol esters of fatty acids, carboxylic amides, polyalkylene oxide block copolymers, aliphatic mono-, di-, and polyamines derived from fatty and rosin acids or mixtures of two or amore of the above.

In certain examples, the coated APF may comprise one or more of: a glass coating, a ceramic coating, a homopolymer and/or copolymer of a polyolefin and ethylene oxide, a polyamide, crosslinked cellulosic materials, a polyurea, a polyurethane, a dehydrated gum, and a surfactant coating, or mixtures of two or amore of the above.

In certain examples, the coating comprises an elastomeric polymer is selected from the group consisting of sulfonated copolymers of ethylene and propylene, sulfonated ter ¬ polymers of ethylene, propylene and a diene, sulfo Butyl rubber, sulfo isoprene/styrene rubber, sulfo isoprene/butadiene rubber, sulfo isoprene/butadiene/styrene copolymers, sulfo isobutylene/styrene copolymers, sulfo isobutylene/para methyl styrene copolymers, and complexes of the aforementioned polymers with a vinyl pyridine co-polymer, or mixtures of two or amore of the above.

Another possibility for the release of the oilfield additive is that the coating is chosen so that it undergoes chemical degradation within a fracture. For example the coating may comprise a substance which undergoes hydrolysis, notably a polymer which is de-polymerised into fragments by hydrolysis, so that the oilfield additive is liberated through progressive breakdown of the coating under conditions encountered in the formation.

A number of chemical groups have been proposed as providing bonds which can be broken, including ester, acetal, sulfide and amide groups. Polymers incorporating such groups include poly(hydroxyacids), polyesters, polypeptides, polyesteramides and polysulfides. Cleavable groups which are particularly envisaged are ester and amide groups both of which provide bonds which can be broken by a hydrolysis reaction. The rate of hydrolysis will be governed by the prevailing pH and temperature and by the chemical structure of the polymer. The hydrolysis rate of an ester group normally attains a maximum under high pH (alkaline) conditions. Conversely for an amide group, the decomposition rate is at a maximum under low pH (acidic) conditions. Low pH, that is to say acidic, conditions can also be used to cleave acetal groups.

A polymer containing hydrolytically cleavable bonds may be a homopolymer of a hydroxycarboxylic acid or an amino carboxylic acid, so that the polymer is a polyester or a polypeptide. Another possibility is that a polymer containing hydrolytically cleavable bonds may be a block copolymer with the blocks joined through ester or amide bonds. Copolymers which contain blocks joined by ester linkages can be prepared by reaction of a pre-polymer with hydroxy groups and a second pre-polymer containing groups which are able to react with hydroxy groups, notably carboxylic anhydride, acyl halide, ketene, ester, sulfonic acid, or sulfonyl halide.

One or both of the pre-polymers may itself be a polymer or oligomer. Prepolymers with reactive hydroxyl groups include oligosaccharides, synthetic polymers containing primary and secondary hydroxyl groups, such as poly(vinyl alcohol) and poly(hydroxy alkyl(meth)acrylate) copolymers, poly(siloxanes), epoxy resins, dihydroxy-terminated poly(amides), dihydroxy-terminated poly(amines), and dihydroxy-terminated poly(carbonates).

Block copolymers in which the blocks are joined through amide linkages can be prepared from pre-polymers containing amino groups. Examples of such pre-polymers include synthetic polymers that contain reactable primary amine groups, such as aminated polyacrylamide and diamino-terminated poly(amines) and poly(amides).

Examples of monomers or polymers containing groups that can be used to react with the hydroxyl-containing materials listed above to yield degradable ester links between polymer blocks or to react with the amino-containing groups listed above to yield degradable amide links include: aliphatic or aromatic polybasic acids, amides, acid anhydrides such as poly(maleic anhydride) and copolymers; polybasic acid alkyl esters, polybasic acid halides, imides, bisimides; and polysulphonic acids such as poly(styrenesulphonic acid).

The coating preferably comprises a polymeric component. The coating polymeric component may form a film on the outside surface of the chemical additive particle, which may be porous or substantially water-impervious. In one example, the polymeric component is self-crosslinked; that is, the polymeric component comprises a substantially homogeneous polymer (which may comprise a homopolymer or a co-polymer) having moieties available for crosslinking with other polymer molecules to form a self-crosslinked polymer. Preferably, before self-polymerization the polymeric component is wholly or partially hydrolyzed. In certain examples, the coating may comprise a first polymer component comprising a self-crosslinked polymer and a second polymer component which may be either self crosslinked or crosslinked to a molecule other than the first polymeric component.

Polymeric components which may be used in a APF coating may comprise, without limitation, polyamide polymers, acrylic polymers (such as vinyl acrylic latex polymers), or polyurethane polymers.

In other examples, the first polymeric component may be crosslinked with a crosslinking agent such as an aziridine or a carbodiimide. However in other examples, the first polymeric component is self-crosslinked; the wax component of the PW coating is preferably substantially not (or is not) cross-linked to the polymeric component of the PW coating.

In certain examples, the coating may comprise an inert particulate, for example (without limitation), a microparticulate silica, in excess of one micron in diameter incorporated as part of the coating. These particles may create imperfections in the coating in the form of small weep holes or channels that facilitate the diffusion of the encapsulated chemical additive into the surrounding solution. In other examples, inclusion of such inert particles into the coating may be absent.

In other examples, the invention is drawn to a coated APF particle comprising a water-dispersible or water-soluble chemical additive encapsulated by a water-insoluble coating comprising a blend of at least one polymer component and a wax component. The coating comprising the polymeric component and the wax component shall be referred to herein as the "PW coating". The polymeric component of the PW coating forms a porous film on the outside surface of the chemical additive particle; the wax component of the PW coating is preferably substantially not (or is not) cross-linked to the polymeric component of the PW coating.

Although not wishing to be limited by theory, the Applicants believe that the wax portion of the PW coating of these exemplary coated APF particles acts to limit the release area of the coating, thereby reducing the rate of release of a water-soluble or water-dispersible chemical within the APF particle when immersed in an aqueous fluid, such as an aqueous hydraulic fracturing fluid. Additionally, it is thought that the nature of this limiting characteristic may change upon an increase in temperature of the surrounding carrier medium, such as the hydraulic fracturing fluid, thus altering the release rate of the encapsulated chemical additive.

In preferred embodiments, the coated APF particles of the present invention contain chemical additives useful in hydraulic fracturing applications. The chemical additives are preferably in solid form at room temperature, although in less preferred embodiments the chemical additives may be in liquid form and frozen, coordinated, used to impregnate a seed particle (such as urea) or otherwise treated prior to coating with the blended wax component and polymeric component. Furthermore, the chemical additives of the present invention are preferably soluble or dispersible in an aqueous medium, specifically within a hydraulic fracturing fluid. By "dispersible" is meant that the chemicals may dissociate from the APF particle as an aggregate of particles that are able to pass through the coating of the PW coated APF particle rather than as individual solvated molecules. This may occur, for example, if a particular chemical additive or population of chemical additives is less than extremely soluble in the aqueous-based hydraulic fracturing fluid. Thus, aggregates of the chemical agent can be liberated from the APF particle when the coating is broken, dissolves, or becomes permeable to the surrounding fluid.

As mentioned above, a range of chemical additives may be encapsulated and carried into a reservoir during fracturing. Without limitation, breakers reduce the viscosity of one or more thickener component. For example, if the thickener in fracturing fluid comprises a polysaccharide such as guar gum, a breaker chemical may be an oxidizing agent, notably a peroxide, an enzyme able to catalyse the depolymerisation of a polysaccharide, or an acid.

If a thickener in fracturing fluid is a viscoelastic surfactant, such as a viscoelastic quaternary ammonium surfactant, the breaker may, for example, be an alcohol, an amine or a carboxylic or dicarboxylic acid incorporating a long hydrocarbon chain so that the alcohol, amine or acid is hydrophobic. A hydrocarbon chain may have at least 12 carbon atoms, for example from 12 or 16 up to 24 carbon atoms. These compounds function as breakers for viscoelastic surfactants. In the case of a carboxylic acid, the function as a breaker is observed when the carboxylic acid group is not dissociated into ions and so the fracturing fluid may be formulated to have an acidic pH at which the breaker acid is below its $pK_a$ value or it may be formulated to reach such an acidic pH as a result of chemical change.

Another possibility is that the chemical additive is a "tracer", that is, a substance which is deliberately introduced into a reservoir so that its presence (or absence) in fluid produced from the reservoir will provide information. The use of tracers to obtain information about a hydrocarbon reservoir and/or about what is taking place therein has been practiced for several decades and has been described in numerous documents. A tracer may be a dye, fluor, or other chemical which can be detected using spectroscopic analytical methods such as UV-visible, fluorescence or phosphorescence. Compounds of lanthanide elements may be used as tracers because they have distinctive spectra. A tracer may be a chemical with distinctive features which enables it to be distinguished by another analytical technique such as GC-MS. Such chemicals include fluorocarbons and fluoro-substituted aromatic acids. Genetically coded material has been proposed for use as a tracer (and International Patent Application WO2007/132137 gives a method for detection of biological tags). Radioisotopes have frequently been used as tracers. Salts of ions which do not occur naturally in subterranean reservoirs, such as iodides and thiocyanates may also be used as tracers.

A further example of a chemical additive which may be encapsulated and introduced into a reservoir in the course of a fracturing job is an inhibitor to control scale formation or corrosion. Such an inhibitor may be released slowly into the hydrocarbon flow when production is commenced or resumed.

Thus, chemical additives can be encapsulated in a coating by various means, such as by spraying particles with a coating solution in a fluidized bed.

An inorganic flow agent ("IFA") may be then be applied to the surface of the coated APF. For example, the inorganic flow agent may be in the form of a solid, for example, a microparticulate or powdered solid, which can then be substantially evenly applied to the surface of the particle. In certain methods of application, the coated APF particles may be, for example, "rolled", shaken or immersed in the IFA, in other embodiments the IFA may, for example, be suspended in a liquid carrier and sprayed onto the coated APF in a fluidized bed coating machine.

Without treatment with an effective flow agent, the coated APF particles tend to clump and form solid blocks upon the passage of time when stored. This requires breaking apart the clumps before use, and can lead to problems when the coated APF is formulated for use or when a slurry of fracturing fluid containing a suspension of such particles is attempted to be made. In contrast, IFA-treated coated APF particles of the present invention remain substantially separate and unclumped when stored under substantially identical conditions. The resulting preparation may thus be more easily and effectively prepared for use, and used, than the coated APF particles either not treated with a flow agent or treated with an uneffective flow, such as, without limitation, organic-based flow agents and non-silicate-based flow agents.

DETAILED DESCRIPTION OF THE INVENTION

In particularly preferred examples, the present invention is drawn to the use of flow agents for maintaining coated APF particles substantially separated during storage and use in hydraulic fracturing operations. In particular, these examples include compositions comprising inorganic flow agents (IFA), and the use of IFA, as improved flow agents for this purpose, as compared to organic flow agents such as magnesium stearate. This improvement increases the storage life of coated APF in containers, and increases the efficiency and usefulness of chemical additives in hydraulic fracturing operations, where the ability of the coated APF to remain in suspension (rather than settling before reaching the desired rock formation) can be critical.

Without limitation, examples of IFA include metal salts of silicates, silicas, metal salts of carbonates, diatomaceous earth, talc, mica, and ceramic particles such as ceramic spheres. Salts of carbonates may have a dual purpose to buffer and partially stabilize higher pH fracturing fluids initially, before the oxidizing breaker is released into the formation to reduce the viscosity of the fracturing fluid.

Without limitation, examples of organic flow agents (OFA) include metal stearates (such as magnesium stearate or zinc stearate), organic stearates (such as glycerol monostearate (GMS)), ethylene bisstearamide (EBS), stearyl erucamide, bis-amides, secondary amides, primary amides, silicone, and PTFE (TEFLON® non-stick coatings).

In currently preferred embodiments, the chemical additives may be viscosity-reducing agents or "breaker" chemicals used, for example, to decrease the viscosity of hydraulic fracturing fluids after fractures have been induced in the rock formations. Typically, a base hydraulic fracturing fluid may be prepared by hydrating a viscosity-inducing polymer such as guar, hydroxyalkyl guar, hydroxyalkyl cellulose, carboxyalkylhydroxyguar, carboxyalkylguar, cellulose or a derivatized cellulose, xanthan and the like in an aqueous fluid to which is added a suitable cross-linking agent. Cross-linking agents may include borates, zirzonates, titanares, pyroantimonies, aluminates, and the like.

However, the APF to be used in conjunction with the present invention is not limited to the controlled release of breaker chemical additives; indeed, any water-soluble or water-dispersible chemical additive for which a controlled rate of release is desired may be included in a coated APF particle. For example, the chemical additive may comprise a scale inhibitor, a hydrate and/or halite inhibitor, a corrosion inhibitor, a biocide, a pour point suppressant, a dispersant, a demulsifier, a tracer, a drag reducer and a well clean up chemical (such as an enzyme) or an mixture of more than one of these agents. Such chemicals may be included in the coated APF particle of the present invention in either solid or liquid form, for example, as disclosed elsewhere in this patent application.

In a preferred use a population of coated APF particles is added above ground to a fracturing fluid. Due to the viscosity-inducing polymer, the fracturing fluid comprises a viscous or gelled polymeric solution or dispersion, a suspended proppant, the coated APF particles and other additives, as necessary or desired. The coating of the APF particles may be soluble, or, preferably, is water-insoluble, not degraded by the breaker chemical, and is permeable to a fluid component of the hydraulic fracturing fluid, and to the solubilized chemical additive in the fracturing fluid, under the conditions of use.

The rate of release of the chemical additive from the coated solid APF particles can be controlled by factors including: the solubility of the coating, the thickness of the coating, the degree of cross-linking of the polymeric component (if any) of the coating, the average pore size formed by any polymeric component of the coating, the biodegradability, if any, of the polymeric component, and the uniformity of application of the coating on the APF particles.

The chemical forming the core of the particle may be used per se when it is in the form of a solid or granule or, in another embodiment of the invention, the chemical additive may be sprayed as a solution or in a dispersed liquid form onto small, finely divided seed particles (such as urea) to form a coating on these seed particles. Essentially any solid which is of the proper size and which is inert to the breaker (or other chemical additive) may be used as the seed particle but urea is preferred. This embodiment is especially preferred where the chemical is itself a liquid, or is irregular in shape or not of the proper size.

The APF particle with or without a seed core, is coated with the desired coating.

If the coating comprises an insoluble polymeric component, the polymeric component of the coated APF particles may comprise any polymeric material that is aqueous fluid permeable and is water-insoluble during its useful life under the physical and chemical conditions of hydraulic fracturing.

Film-forming polymers are known, and may include, for example, homopolymers, copolymers and mixtures thereof, wherein the monomer units of the polymers are preferably derived from ethylenically unsaturated monomers, for example, two different such monomers.

A particularly useful ethylenically unsaturated monomer is a compound with the formula $(R_1)(R_2)(R_3)C$—COO—$(CH=CH_2)$ (Compound 1) wherein $R_1$, $R_2$, and $R_3$ are either hydrogen or saturated alkyl groups or chains. In one example, $R_3$ of compound I is $CH_3$, and $R_1$ and $R_2$ of compound I have a total of about 2 to about 15 carbons; for example, such a molecule having 6 total carbons. In another embodiment, $R_3$ is $CH_3$, and $R_1$ and $R_2$ have a total of about 5 to about 10 carbons. In another embodiment, $R_3$ is $CH_3$, and $R_1$ and $R_2$ have a total of 7 carbons, i.e. $R_1+R_2=C_7-H_{16}$.

In another embodiment, each of the $R_1$, $R_2$, and $R_3$ of compound I is a single chemical element. For example, the element may be a halogen, preferably a chloride. More preferably, the element may be hydrogen. Compound I having hydrogen as the element for $R_1$, $R_2$ and $R_3$ is known as vinylacetate.

In another embodiment, $R_1$ of compound I may be a single chemical element, and $R_2$ of compound I may be a saturated alkyl chain.

Other examples of ethylenically unsaturated monomers that may be comprised in the polymeric component of the APF coating include: monoolefinic hydrocarbons, i.e. monomers containing only carbon and hydrogen, including such materials as ethylene, ethylcellulose, propylene, 3-methyl-butene-1,4-methylpentene-1, pentene-1,3,3-dimethyl-butene-1,4,4-dimethylbutene-1, octene-1, decene-1, styrene and its nuclear, alpha-alkyl or aryl substituted derivatives, e.g., o-, or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, ally alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1,3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like. Other useful ethylenically unsaturated monomers are styrene, methyl methacrylate, and methyl acrylate.

In many examples, the polymeric component of the coating of a coated APF particle comprises a hydrophobic polymeric element.

Examples of preferred polymeric components include: polymers derived by copolymerizing acrylic ester monomers and ethylenically unsaturated monomers. Acrylic ester monomers include esters of acrylic acid and/or of methacrylic acid, with carbons containing from 1 to 12 carbon atoms, and preferably $C_1$-$C_8$ alkanols, such as methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate, as well as vinyl nitriles, including those containing from 3 to 12 carbon atoms, in particular acrylonitrile and methacrylonitrile.

Examples of preferred ethylenically unsaturated monomers that are polymerizable with the above monomers are vinyl esters of carboxylic acids, for instance vinyl acetate, vinyl versatate or vinyl propionate. In certain examples, these may be incorporated in the coating at up to 40% by weight of the total weight of the copolymer.

Other polymers that may be used in the polymer component of the coating are mixtures of alkyl acrylates and styrene acrylate; vinyl acrylic latex polymers containing about 0% to about 60% (weight) monovinyl aromatic content such as styrene, and from about 15% to about 95% (weight) alkyl acrylate or methacrylate ester. The alkyl acrylate or methacrylate ester can comprise, for example, ethyl butyl or 2-ethylhexylacrylate, methyl, butyl or isobutyl methacrylate or mixtures thereof. Vinyl acrylic latex polymers of the type described above are commercially available from, for example, Rohm and Haas Company, Philadelphia, Pa. or S. C. Johnson Wax, Racine, Wis.

In other coating examples, the polymeric component may comprise polymers including units from vinyl acetate, ethylene and vinyl chloride, and combinations thereof, that is, combinations of such polymers. In another embodiment, the polymeric component may be selected from polymers including units from vinyl acetate; an acrylate ester including, for example, lower alkyl, for example, alkyl having from 1 to about 6 carbon atoms, acrylate and methacrylate esters, such as butyl acrylate, butyl methacrylate and the like; and at least one monomer selected from vinyl neopentanoate, vinyl neohexanoate, vinyl neoheptanoate, vinyl neooctanoate, vinyl neononanoate and vinyl neoundecanoate. Combinations of such polymers can also be employed. Such polymeric components including units selected from one of vinyl neononanoate, vinyl undecanoate and vinyl neopentanoate may be employed.

Combinations of the polymeric components disclosed in the immediately preceding two paragraphs can be included in the same coating, and such embodiments are included within the scope of the present invention.

While in a preferred embodiment a separate cross-linking reagent is not part of or comprised as part of a polymeric component or the coated APF particle, in other embodiments a separate cross-linking reagent may be used to provide cross-linking of the polymer chains. The addition of a separate cross-linking reagent in combination with an appropriately reactive polymer often results in smaller pores and a resulting lower release rate, depending in part on the concentration of the cross-linking reagent and the degree of polymerization that is permitted to occur. Examples of a suitable cross-linking reagent may include, without limitation, an aziridine pre-polymer (for example, pentaerythritol-tris-[β-(aziridinyl)priopionate] or a carbodiimine (for example, 1,3-dicyclohexyldicarbodiimide). When used, the cross-linking agent may be admixed with, for example, an acrylic polymer in an amount of from about 0.5% to about 10% by weight of total solids present. For example, the cross-linking agent may be present in an amount of from about 2.5% to about 3.5% by weight of total coating solids.

A particularly preferred polymeric component may comprise an acrylic copolymer containing branched vinyl ester monomers, wherein at least one of the branched vinyl ester monomers is a vinyl versatate monomer. In a particularly preferred example the polymeric component initially comprises a liquid dispersion of the copolymer in water (a colloidal dispersion of polymer microparticles in an aqueous medium is referred to as a latex), wherein the acrylic/vinyl versatate copolymer particles (about 0.07 microns in size) are present at between 40% and 50% by weight and water between 50 and 60% by weight.

Arkema, Inc., King of Prussia, Pa., sells a preparation of such a polymer under the name NeoCAR™. This preparation has a viscosity of about 150 cP (centipoise) and a pH of about 8.5, about 45% by weight of solids, and has a glass transition temperature (Tg) midpoint of 50° C. and a minimum filming temperature (MFT) of about 45° C., and is characterized as a hydrophobic latex exhibiting ambient self-crosslinking; the preparation is not mixed with a separate cross-linking reagent before use. However, in other examples the polymer may be mixed with the acrylic polymer at a concentration from about 05 to about 10% by weight of total solids in the coating solution or dispersion; preferably from about 2.5% to abut 3.5% by weight.

Also, within some examples of the invention a solid microparticle, such as particles having a size range of from about 1 micron to about 15 microns, or from about 1 to about 3 microns, and preferably having less than about 33% by weight of sub-micron sized particles, may be used in the coating to create weep holes or channels on the polymeric coating. Such particles may comprise, for example, solid silica particles, but any inert solid of similar size may be used. Other such solids may comprise, for example, calcium carbonate, titanium dioxide, barium sulfate, and calcium sulfate. Solid microparticles may be used at a concentration from about 0% to about 60% of the coating solids, and may, in certain examples, preferably be used at about 30% to about 50% by weight.

Whether or not the coating comprises solid microparticles such as silica, in certain examples a wax component may be added to a polymeric component of the coating solution or dispersion. The wax component may comprise natural and/or synthetic waxes or a blend of such waxes. By "wax" is meant an organic, water insoluble hydrophobic compound or class of compounds that is/are plastic (malleable) near room temperature (about 70° F. to about 75° F.); generally, waxes melt above 100° F. and form liquids of low viscosity. Natural waxes include waxes such as beeswax, cines wax, shellac wax, Carnauba wax, montan wax (extracted from lignite and brown coal) and paraffin wax (from petroleum). Synthetic waxes include polyethylene wax, substituted amide waxes, polymerized α-olefines, polypropylene wax and tetrafluoroethylene wax (PTFE). Polypropylene wax is generally polymerized from propylene and then either maleated or oxidized to give chemical functionality so that it is more easily emulsified. Polypropylenes are hard materials with molecular weights from 10,000-60,000+ and high melting points from 248° F.-320° F.

In a preferred example, the wax component of the present invention is a mixture or blend of more than one wax, with a first wax having a higher melting point before blending than a second wax. In a preferred example the wax component of the coating may comprise a paraffin wax and/or a polyethylene wax, or a mixture of these. A particularly preferred wax component comprises a blend of paraffin and polyethylene waxes.

Paraffin waxes are generally mixtures of alkanes (e.g., $CH_3-CH_{2(n)}-CH_3$ and/or, less commonly, branched versions of these alkanes) that fall within the $20 \le n \le 40$ range. Paraffin waxes are a by-product of petroleum refining; they are found in the solid state at room temperature and begin to enter the liquid phase past approximately 37° C. (about 100° F.). Commercially available emulsions of paraffin wax generally comprise from about 40% to about 60% solids by weight.

Polyethylene waxes are synthetic waxes. Polyethylene waxes are manufactured from ethylene, which is generally produced from natural gas. The polyethylene may be oxidized or co-polymerized with acrylic acid to give the polyethylene chemical functionality, which allows it to be emulsified. Polyethylene is classified as either high-density polyethylene (HDPE) or low-density polyethylene (LDPE). HDPE is higher melting (230° F.-284° F.) and is harder. LDPE is lower melting (212° F.-230° F.) and softer. Preferably, the polyethylene wax used in the wax component of the PW coating of the present invention has a melting temperature of up to about 224° F. Commercially available emulsions of paraffin wax generally comprise from about 24% to about 40% solids by weight.

Mixtures or blends of waxes having different melting temperatures will generally have an melting temperature intermediate between the melting points of the waxes having the highest and lowest melting temperatures.

Preferably, the wax component, if present, has a melting point greater than about 100° F., or greater than about 120° F., or greater than about 130° F., or greater than about 135° F., or greater than about 140° F., or greater than about 145° F., or greater than about 150° F., or greater than about 155° F., or greater than about 160° F., or greater than about 165° F., or greater than about 170° F., or greater than about 180°, or greater than about 190° F., or greater than about 200° F., or greater than about 210° F., or more. Those of ordinary skill recognize that the wax component may have a melting point that falls within a range from about 100° F. to about 215° F. or more, or any subrange of this range (100° F. to about 215° F.) comprising temperature integers falling within this range, and that this specification specifically describes each and every such subrange. Similarly, any range of values provided in this specification will be understood to include a specific disclosure of each and every sub range, as expressed in natural numbers, contained between the high and low values of the broadest range.

The wax component may be charged (cationic or anionic) or uncharged in aqueous dispersion or emulsion, or in mixture with the polymeric component. Preferably, the wax component is anionic.

In a particularly preferred example, the wax component comprises a commercially available emulsion comprising a blend of a paraffin wax and a polyethylene wax bearing the trade name Michem® Lube 270R and sold by Michelman company.

Preferably, a water-miscible solvent suitable for use as a coalescent is also used in preparing the coating emulsion. For example, the glycol ether Butyl Carbitol™ (diethylene glycol butyl ether) is currently a preferred solvent in the coating emulsion of the coated APF particles used in the present invention. However, those of ordinary skill in the art will recognize that other coalescing solvents may be used in the coatings, such as (without limitation): ethylene glycol monobutyl ether and/or other alkyl ethers of ethylene glycol, such as those commonly used in paints; acetates of glycol; and 2,2,4-tromethyl-1,3-pentanediol monoisobutyrate; liquid esters (e.g., those produced by the reaction of isobutyl alcohol with a dibasic acid, and mixtures thereof; and other coalescing solvents.

Preferably (although not invariably) the polymeric component of the coating, which may be self-crosslinked, is not additionally cross-linked using a separate cross-linking reagent.

In the present invention, one or more chemical additives are incorporated into APF particles in which the chemical additive is encapsulated by a coating.

The coated APF particles which are to be pumped into the well bore are preferably free-flowing after their manufacture. Not only does this property make the APF particles easier to handle in the preparation of the delivery fluid, but a free-flowing coated APF will be much easier to suspend, and maintain in a suspension, of the delivery fluid.

The relative dimensions and quantities may be such that the amount of oilfield chemical encapsulated within a particle is between 1 and 90 wt % of the overall particle, possibly between 1 and 80 wt %. The median size of the overall coated APF particles may lie between about 50 microns and 5000 microns or more; those of ordinary skill in the art will recognize that or about 100 microns and about 3000 microns, or about 200 microns, or about 300 microns, or about 500 microns or about 750 microns and about 2000 microns. In a particularly preferred embodiment, the coated APF particles have a mean diameter (or longest dimension) of from about 50 microns to about 5000 microns, or any subrange of this range comprising micron integers of length falling within this range, and that this specification specifically describes each and every such subrange.

While this invention is further described below with respect to various specific examples and embodiments, it is to be understood that the invention is not limited thereto and that it can be variously practiced consistent with the scope of the following claims. For example, any feature disclosed herein may be combined with any other component or feature and will be deemed to fall with the description of this patent application.

EXAMPLES

Example 1

A coated APF (where the additive chemical is ammonium persulfate) particle (Sample A) according to the present invention is made as follows: a breaker chemical additive comprises 500 grams of ammonium persulfate particles having a size distribution wherein 42% of the particles have a diameter (or longest dimension) greater than 850 microns, and 58% of the particles have a diameter (or longest dimension) greater than 424 microns. The particles are placed within a bottom spray Wurster coating fluidized bed apparatus (Magna Coater Fluid Bed system, Model 0002 having a 6.7 liter capacity) for coating. Ammonium persulfate is solid and stable at temperatures below about 212° F.

A coating spray solution is made as follows: a polymer component pre-formulation is first made by combining and thoroughly mixing NeoCAR® 850 with butyl carbitol and water at the weight ratio of 91.7 to 4.2 to 4.1, respectively. This polymer component is then combined and mixed with 1.2% Michem™ Lube wax component to make a 100% emulsion.

450 grams of the resulting PW coating spray is then loaded into the spray reservoir of the bottom spray Wurster coating device. The coating chamber, which is cylindrical in shape, is concentric to and approximately half the diameter of the outer chamber. The bottom of the device is a perforated plate containing larger holes under the inner (coating) tube. The liquid spray nozzle is located in the center of the base, and is position to permit the circulation of particles from the outside annular space to the high velocity airstream within the coating chamber. The ammonium persulfate particles move upwards in the center, where coating and efficient drying and water vapor/solvent removal occur. At the top of the coating chamber the particles discharge into an expansion area and then flow down as a gas/solid suspension into the annular space surrounding the center coating chamber.

The coating mixture is applied using an atomizing nozzle at a temperature of 25° C., an atomizing air pressure of 25 psi, and an airflow of 25 SCFM at a spray flow rate of about 8 g/min. After the coating is applied to an average of about 25% of the weight of particles, the finished encapsulated ammonium persulfate has a temperature of 15° C.

Following drying and overnight storage in a container, the coated particles are not separate, but form one or more clumps that are difficult to break up.

Example 2

Another encapsulated ammonium persulfate particle preparation is made as follows. About 1000 grams of 20-50 mesh (U.S. Sieve Series) ammonium persulfate obtained from FMC Corporation are placed in a Versaglatt GPCG I fluidized bed apparatus. The Versaglatt unit is set up to provide top spray by insertion of a top spray insert and a three micron filter bag is utilized. The spray nozzle is placed in the lower position on the top spray insert. A 1.2 mm nozzle is utilized.

The coating agent is prepared by adding 182 grams of water to 790 grams of a partially hydrolyzed acrylate/silica mixture. The acrylate/silica mixture contains 26.8% of approximately 1 micron diameter-sized silica particles, by weight, and 28.4% acrylate resin. Thereafter, 28 grams of a crosslinker comprising an aziridine prepolymer, present as a 50% solution, is added to the mixture and the coating is then applied by spraying. The coating material is applied at a coating agent temperature of 35° C., an atomizing air pressure of 2.0 bar, an air rate of 3-4 m/sec. and a spray flow rate of 15 ml/min. After the coating agent is applied, the coated APF is heated to a temperature of about 42° C. for a period of about 10 minutes and then cooled to room temperature to produce a coated APF having a coating comprising 31%, by weight, of the weight of the particles.

Following drying, one half of the coated APF is placed into a vessel overnight; the other half is placed into a vessel and dry calcium silicate powder having a median size of about 8 microns is added to a weight percentage of 0.5% of the total coated APF weight. This second vessel is then sealed and tumbled for 1 hour to evenly cover the outer surface of the coated APF particles, then stored overnight. After overnight storage, the coated APF not treated with calcium silicate formed a single clump within the storage vessel, and could not be poured from the vessel as a free-flowing powder. By contrast, the coated APF treated with calcium silicate formed no clumps, and was entirely free flowing.

Example 3

A 100 lb batch preparation of coated APF particles is made as follows:

A preparation of a PW coating composition is made by combining 3.70 lb of deionized water, 4.0 lb of glycol ether DB (diethylene glycol monobutyl ether), 86.05 lb of Neocar® 850, 5.0 lbs of Michem™ 270R wax emulsion, and 1.25 lb of polyfunctional aziridine PZ-28 (trimethylolpropane tris(2-methyl-1-aziridine propionate) to form a solution. This coating composition is loaded into the spray reservoir of the bottom spray Wurster coating device.

The ammonium persulfate particles (70 lb) are preferably between about 4 and about 100 mesh, more preferably between about 4 and about 50 mesh, more preferably between about 10 and about 50 mesh, even more preferably between about 20 and about 40 mesh.

79.24 lbs of the liquid net weight of the PW coating composition is loaded into the spray reservoir of the bottom spray Wurster coating device and used to coat 70 lbs of sifted ammonium persulfate particles. The coating is applied under the following conditions.

| Inlet flow rate: | 500-800 SCFM (depending upon the batch weight and filter cleanliness as the run progresses) |
| --- | --- |
| Temperature: | 50°-60° C. at the beginning of the run; 30° C. at the end of the run to dry and cool the breaker particles. |
| Coating spray pressure: | 30 psi |
| Coating spray rate: | 0.8-2.5 lbs per minute |
| Shuttle opening: | 6-18% |
| Partition Height: | 1-1.75 inches |
| Nozzle tip: | 1.5-3.0 mm |

When the coating composition has been sprayed onto the particles at the desired weight percentage (30% in this embodiment), the coated particles are permitted to dry, transferred to a vessel, and then 0.5% by weight of magnesium stearate powder (0.775 lb) is added to the vessel and tumbled for one half hour to coat the exterior surface of the coated APF particles. The magnesium stearate treated coated APF is then stored overnight in a container. Following storage the coated APF is inspected, and found to be clumped in the container, and is not free flowing.

Example 3

Coated APF particles of Example 1 and 2 are made in 225 lb quantities (5 lots of each type (self-crosslinked acrylic/wax component coated APF (Type 1) and crosslinked acrylic/aziridine plus silica coated APF (Type 2) in a bottom spray Wurster coating device at inlet flow rate, temperature, coating spray pressure, coating spray rate, shuttle opening, partition height, and nozzle tip parameters in a manner substantially as set forth in Example 3 to a weight percentage of about 30% of the total coated APF.

Following the drying of the coated APF, each 220 lb lot is placed into a vessel. These vessels are labelled 1-5. A composition comprising one or more candidate flow agent is added to each vessel and tumbled for one hour, then visually evaluated for the ability of the coated APF to be poured as a freely flowing powder. The results, rated on a scale from 1 to 10 (from worst to best), and identity of the candidate flow agents are shown in Table 1.

TABLE 1

| Vessel | Flow Agent | Results | Rating |
| --- | --- | --- | --- |
| 1 | 0.5% Mg stearate | Product clumped up in vessel | 3 |
| 2 | 0.25% calcium silicate | Product free flowing | 10 |
| 3 | 0.5% Mg stearate plus 1% naphthalenesulfonicacid powder | Product clumped up in vesssel | 3 |
| 4 | 0.5% Mg stearate plus 1% calcium silicate | Product free flowing | 10 |
| 5 | 0.5% Mg stearate plus 1% glycerol monostearate (GMS) | Product free flowing | 8 |
| 6 | 0.5% glycerol monostearate (GMS) | Product clumped up in vessel | 3 |

As can be seen, application of 0.5% magnesium stearate on the coated APF particles following drying results in deleterious performance and clumping of the coated APS particles in the container upon storage. Similarly, tumbling the coated APF particles with 0.5% magnesium stearate and 1% naphthalenesulfonicacid powder (another widely used flow agent), also results in clumping of the coated APF particles within the vessel to the same degree. Additionally, tumble dusting of 0.5% glycerol monostearate on the coated APF also resulted in clumping of the coated APF to about the same degree as with 0.5% magnesium stearate.

These clumps of coated APF become hardened upon storage or shipment, and thus render the coated APF unpourable. Consequently, these treatments all were rated 3 (poor) on a scale of 1-10.

Tumble dusting of the coated APF with 0.5% 0.5% magnesium stearate plus 1% glycerol monostearate (GMS) resulted in a relatively free-flowing coated APF preparation as a whole, but included a number of visible clumps of material.

However, coated APF tumbled with 0.25%, 0.5% or 1% of the inorganic flow agent calcium silicate produced a superior, smoothly free-flowing coated APF product at all concentrations tested.

Example 4

Five lots of coated APF particles are made substantially as set forth in Example 3 above, except that the coating formulations are varied as set forth according to Formulas A, B, C, D, and E as set forth in Table 2 below.

TABLE 2

| Ingredient | Formula A | Formula B | Formula C | Formula D | Formula E |
| --- | --- | --- | --- | --- | --- |
| Deionized water | 3.70% | 3.70% | 3.93% | 3.89% | 3.95% |
| Glycol ether DB | 4.00% | 4.00% | 4.25% | 4.22% | 4.27% |
| Neocar 850 | 86.05% | 86.05% | 86.80% | 90.57% | 91.78% |
| Michem ™ 270R wax emulsion | 5.00% | 2.50% | 5.00% | 0% | 0% |

TABLE 2-continued

| Ingredient | Formula A | Formula B | Formula C | Formula D | Formula E |
|---|---|---|---|---|---|
| polyfunctional aziridine PZ-28 (trimethylolpropane tris(2-methyl-1-aziridine propionate) | 1.25% | 1.25% | 0% | 0% | 0% |
| Glycerol monostearate (GMS) | 0% | 2.50% | 0% | 0% | 0% |

As can be seen, the coating formulation of Formula A is substantially identical to the formulation set forth in Example 3, and is the reference formulation. Formula B contains half as much of the wax component and also contains 2.50% glycerol monostearate. Formula C contains no aziridine and has slightly more of the glycol ether, Neocar™ polymeric component, and water. Formula D lacks the wax component and contains slightly adjusted amounts of the other components. Formula E lacks both aziridine and wax.

100 lb lots of ammonium persulfate APF are coated with each of Formula A through E, and each lot air-dried in the fluidized bed coating apparatus, then tumble coated with 0.25% (w/w) calcium silicate having a median diameter of about 8 microns, as disclosed above, then stored overnight in plastic bags.

After overnight storage each lot of coated APF is analysed for clumping. In each case, the coated APF preparation contains no clumps, and pours as a free flowing powder.

Example 5

Six 100 lb. lots of coated APF of Formula A above are made and air dried. Each lot is tumble dusted with a different inorganic flow agent (IFA) provided as a microparticulate powder at a weight percentage of 0.4% with the microparticles having a mean diameter of from about 6 to about 10 microns. The IFAS included: calcium silicate, calcium carbonate, diatomaceous earth, talc, mica, and ceramic microspheres. Following tumble dusting and storage overnight in plastic bags, the coated APF particles are tested for flowability. In each case, the coated APF preparation lacks clumps and is a free flowing, pourable powder.

While this invention has been described with respect to various specific examples and embodiments, it is to be understood that the invention is not limited thereto and that it can be variously practiced within the scope of the following claims. For example, any feature disclosed herein may be combined with any other component or feature and will be deemed to fall with the description of this patent application.

Each and every publication, patent and published patent application cited herein is individually incorporated by reference in its entirety as part of the specification of this application.

We claim:

1. A composition comprising a chemical additive component core, said core consisting of a solid chemical additive per se, encapsulated by a single layer coating comprising an acrylic copolymer containing branched vinyl ester monomers, at least one of said vinyl ester monomers comprising a vinyl versatate monomer; said composition having an exterior surface dusted with a dry microparticulate inorganic flow agent (IFA), and said composition lacking an inert particulate incorporated as part of the single layer coating.

2. The composition of claim 1 in which the median IFA particle size is about 1 micron to about 10 microns in diameter.

3. The composition of claim 2 in which the median IFA particle size is about 8 microns in diameter.

4. The composition of claim 1 wherein the inorganic flow agent is selected from the group consisting of metal salts of silicates, silicas, metal salts of carbonates, diatomaceous earth, talc, mica, and ceramic particles such as ceramic spheres.

5. The composition of claim 4 in which the IFA comprises a silicate.

6. The composition of claim 5, in which the IFA comprises calcium silicate.

7. The composition of claim 1 comprising:
a particulate active component comprised in said chemical additive component, said particulate active component selected from the group consisting of a scale inhibitor composition, a hydrate and or halite inhibitor composition, a pour point suppressant composition, a dispersant, a demulsifier, a tracer, a drag reducer, a viscosity-reducing composition, an oxidizer composition, a pH modulating composition, a lubricant composition, a cross-linking composition, an anti-corrosion composition, an biocide composition, a crosslink-enhancing composition, and a combination of two or more of these compositions.

8. The composition of claim 1 in which the coating comprises a water insoluble component.

9. The composition of claim 1 in which the polymer component is self-crosslinked.

10. The composition of claim 9 in which the coating comprises a compound selected form the group consisting of an aziridine and a carbodiimide.

11. The composition of claim 10 in which the coating comprises an aziridine.

12. The composition of claim 1 wherein the chemical additive component comprises a breaker component.

13. The composition of claim 1 wherein the chemical additive component comprises an ammonium persulfate component.

* * * * *